United States Patent [19]

Simard

[11] Patent Number: 5,572,604
[45] Date of Patent: Nov. 5, 1996

[54] METHOD FOR PATTERN RECOGNITION USING PROTOTYPE TRANSFORMATIONS AND HIERARCHICAL FILTERING

[75] Inventor: Patrice Y. Simard, Eatontown, N.J.

[73] Assignee: Lucent Technologies Inc., Murray Hill, N.J.

[21] Appl. No.: 344,791

[22] Filed: Nov. 23, 1994

Related U.S. Application Data

[63] Continuation of Ser. No. 156,344, Nov. 22, 1993, abandoned.

[51] Int. Cl.$^6$ ............................................. G06K 9/62
[52] U.S. Cl. ............................................. 382/224; 382/276
[58] Field of Search .................................... 382/160, 224, 382/225, 228

[56] References Cited

U.S. PATENT DOCUMENTS

| | | | |
|---|---|---|---|
| 4,601,054 | 7/1986 | Watari et al. | 382/224 |
| 5,077,807 | 12/1991 | Bokser | 382/36 |
| 5,181,259 | 1/1993 | Rorvig | 382/225 |
| 5,337,371 | 8/1994 | Sato et al. | 382/224 |
| 5,347,595 | 9/1994 | Bokser | 382/225 |
| 5,422,961 | 6/1995 | Simard | 382/224 |

OTHER PUBLICATIONS

Complex Systems, vol. 2, No. 3, pp. 321–55, "Multivariable Functional Interpolation And Adaptive Networks", D. S. Broomhead, D. Lowe, Jun. 1988.

"Pattern Classification And Scene Analysis", Richard O. Duda and Peter E. Hart Authors, Wiley–Intersciene Publication, copyright 1973. (Chap. 4, pp. 85–105); Nonparametric Techniques.

Park et al. "Automated Design of Piecewise–Linear Classifiers of Multiple–class data." 9th Int. Conf. on Pattern Recognition, vol. 2, pp. 1068–1071, Nov. 1988.

Perantonis et al. "Translation, Rotation, and Scale Invariant Pattern Recognition by High–Order Neural Networks and Moment Classifiers" IEEE Trans. on Neural Networks, vol. 3, ISS:2, pp. 241–251, Mar. 1992.

*Primary Examiner*—Joseph Mancuso
*Assistant Examiner*—J. Patel
*Attorney, Agent, or Firm*—Martin I. Finston

[57] ABSTRACT

Articles being graphical input patterns are sorted by a pattern-recognition machine that includes a data base of prototype patterns, each labeled with its respective class. The sorting method includes stops of storing input patterns in the pattern-recognition machine and classifying the stored input patterns. The classification is performed by calculating at least two distance functions between input patterns and prototype patterns. The distance functions belong to a hierarchy of distance functions that vary in the degree to which they are computationally intensive, and concomitantly, in their accuracy. Overall computational requirements are reduced by using less computationally intensive distance functions to preliminary filter out those prototype patterns that are farthest from the input pattern.

7 Claims, 7 Drawing Sheets

CLASS BOUNDARY

METHOD FOR PATTERN RECOGNITION USING PROTOTYPE TRANSFORMATIONS AND HIERARCHICAL FILTERING

This application is a continuation of application Ser. No. 08/156,344, filed on Nov. 22, 1993.

FIELD OF THE INVENTION

This invention relates to apparatus and methods for recognizing patterns and, particularly, to a novel method for classifying alphanumeric patterns in a pattern recognition machine which is insensitive to specific transformations of the input or unknown patterns.

BACKGROUND OF THE INVENTION

In pattern recognition machines, such as that described in patent application Ser. No. 07/770267, filed Oct. 3, 1991, and assigned to Applicant's assignee, it is usual to store large amounts of prototype patterns and compare them to a given example or unknown input symbol for identification. In several pattern comparison processes using common algorithms, such as K-nearest Neighbor (KNN), Parzen windows, and radial basis function (RBF), the comparison is performed by generating a distance measure, for example the Euclidean distance, between patterns and prototypes. The KNN and Parzen windows algorithms are described in the book, *Pattern Classification and Scene Analysis*, by Duda and Hart, 1973; and the RBF algorithm is described in the article, "Multivariate Functional Interpolation and Adaptive Networks," appearing in *Complex Systems*, by D. S. Broomhead and D. Lowe, which are hereby incorporated by reference.

According to these, and related algorithms, the several prototypes which have the smallest distances from the example each cast a vote. The voting determines the class of the example. Variations on the voting scheme and on how the distance measure is used account for the difference between the KNN, Parzen windows, RBF and other distance-based classification algorithms.

These classification methods find important applications in optical character recognition. For example, these methods are usefully employed in machines for making accurate classifications as to the identity of letters and numbers in the address block of envelopes being processed at a postal service sorting center. In these machines, it is necessary that the classifier recognize accurately the many shapes and sizes in which each letter or number are formed in script placed on the envelopes by postal service users.

Thus, a desirable property of a pattern recognition machine is that its output be invariant with respect to certain small transformations of its input. That is, some transformations of a meaningful pattern, such as an alphanumeric symbol, will not affect the interpretation of the pattern by a human observer. A comparison scheme that is invariant to such transformations can operate with greater economy and speed than comparison schemes that require exhaustive sets of prototypes. By way of example, transformations of alphanumeric patterns that are of interest in this regard include translation, rotation, scaling, hyperbolic deformations, line thickness changes, and grey-level changes.

A new scheme for comparing prototypes to examples in recognition machines which practice the KNN, Parzen window and RBF algorithms has been described in the U.S. Pat. No. 5,422,961 and assigned to Applicant's assignee, hereby incorporated by reference. This comparison scheme is invariant with respect to a selected set of small transformations of the prototypes or the examples. The transformations are expressed using only a few operators. A distance function is used that allows accurate choices to be made, as to the class of the example, that are invariant to small transformations of either the example or the prototype.

The small transformations of interest are expressed by calculating the derivative of the transformed image with respect to the parameter that controls the transformation. This directional derivative is used to generate the computational representation of the transformation of interest.

The transformation of interest (i.e., with respect to which invariance is desired) can be efficiently expressed by using the tangent vectors to the surface of transformation. Any desired number of possible invariances can be included in any particular recognition process.

This comparison scheme can appreciably enhance the speed and accuracy with which, e.g., alphanumeric symbols are recognized. However, an example pattern, to be recognized, must be compared with each of the stored prototypes.

According to practices of the prior art, all of these comparisons are performed at the same level of detail. This is inherently inefficient because a reduced level of detail in the comparisons may suffice to determine how close the example pattern is to many of the prototypes.

SUMMARY OF THE INVENTION

I have provided a new and improved method for sorting articles bearing graphical patterns, which are to be referred to as input patterns. According to this method, each input pattern is converted to a stored pixel array in a digital pattern-recognition machine; each input pattern is then classified; and then, in response to the classification, a further action is taken in respect to the corresponding article, such as marking it or physically disposing of it in some way. The digital pattern-recognition machine comprises a data base of prototype patterns. Each of these patterns belongs to one of a multiplicity of known classes, and each is labeled with its respective class. The classification of each input pattern comprises the steps of: evaluating a first distance function $d_1$ between the input pattern and each of the prototype patterns; in response to this first evaluating step, keeping the $K_1$ closest prototype patterns and eliminating from consideration the rest of the prototype patterns, wherein $K_1$ is a positive integer less than the total number of prototype patterns in the database; and evaluating at least a second distance function $d_2$ between the input pattern and each of the $K_1$ kept prototype patterns. After this second evaluating step, and possibly after still further, subsequent distance-evaluating steps, the best class is selected using an appropriate decision procedure, which could, for example, be the KNN, Parzen window, or RBF algorithm. This best class is selected from the classes represented in a population of prototype patterns that is limited in response to the second distance-function evaluating step. In accordance with the invention, the evaluation of $d_2$ is more computationally intensive than the evaluation of $d_1$ as measured by the required number of floating point operations; and $d_1$ and $d_2$ are defined such that the probability of making a classification error using $d_2$ alone is less than the probability of making a classification error using $d_1$ alone.

DETAILED DESCRIPTION OF AN ILLUSTRATIVE EMBODIMENT

Figure 1:
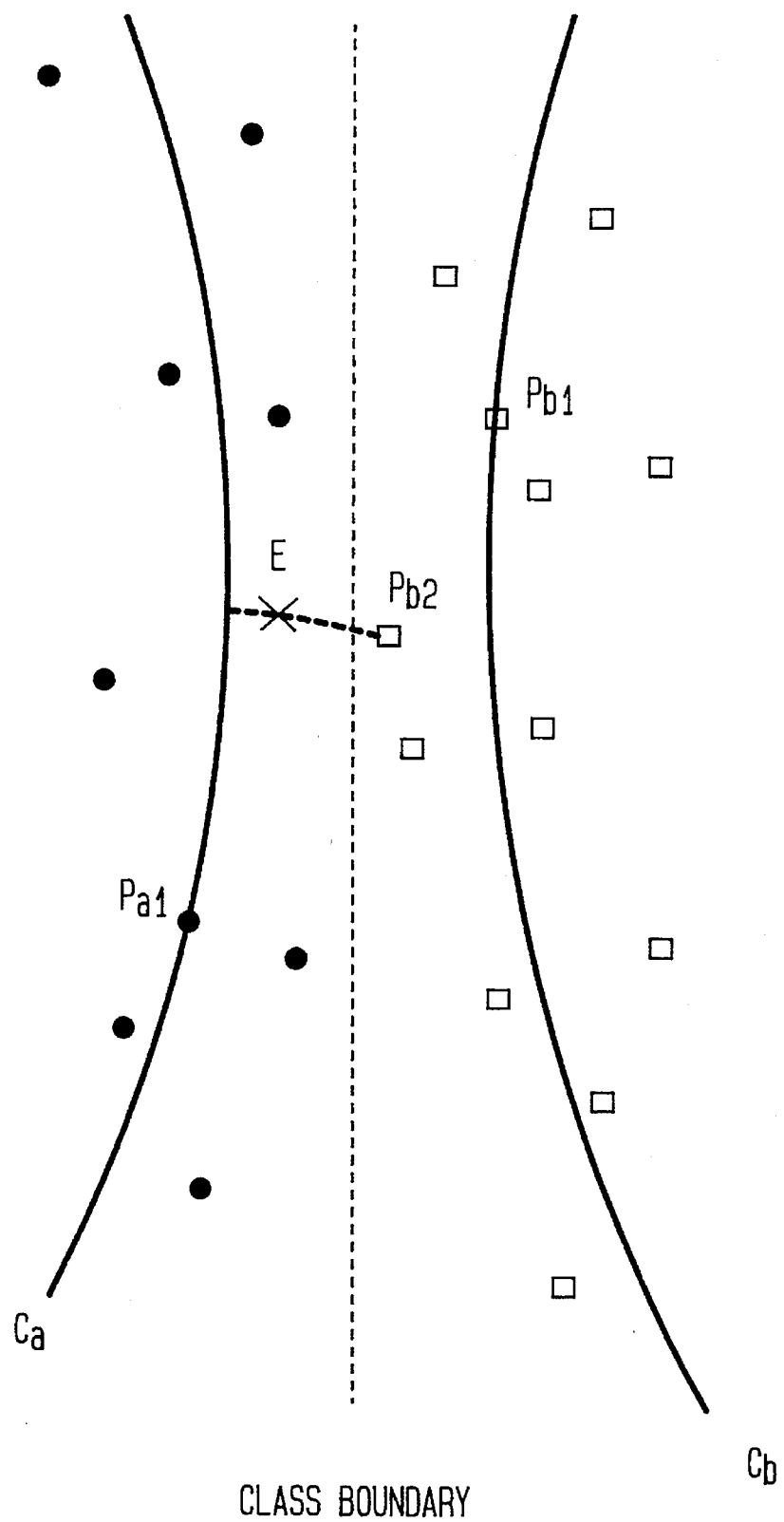
FIG. 1 is a graph illustrating the concept of class boundaries.

In character recognition, classification is desirably insensitive to vertical and horizontal translations, scaling, and at least some rotations. Such class invariant transformations are conveniently discussed with reference to FIG. 1. Represented in FIG. 1 is a multidimensional space in which each original and transformed input pattern, and each original and transformed prototype pattern, is represented by a point. The dimension of this space corresponds, typically, to the number of pixels in the images that are to be compared. (For pedagogical purposes, the dimensionality of the space represented in the figure has been reduced to 2.) Variables in this space typically assume continuous values, corresponding to grey-scale variations.

Referring to FIG. 1, assume that the curves $C_a$ and $C_b$ illustrate the effect of these transformations on patterns $P_{a1}$ and $P_{b1}$. The pattern $P_{a1}$ is one of a plurality of prototype patterns of class a, and the pattern $P_{b1}$ is one of a plurality of prototype patterns of class b. There exist such transformation curves for every prototype of alphanumeric script, for example. Since the transformations have been chosen to leave the class invariant, these curves cannot cross the class boundary line (indicated by a dashed line on the figure). It is, therefore, an advantage to evaluate the distance from the example E to the closest transformed prototype rather than to the plain prototype. It is readily seen on the figure that the distance from E to $C_a$ is smaller than the distance from E to $P_{b2}$. The example E will, therefore, be classified correctly as a class a pattern using the invention. By using a distance which considers all the transformations of each prototype, it is much more likely that the closest prototype will be of the correct class. The transformation curve cannot cross the class boundary because of the constraint imposed by the definition of invariance.

The difficulty of calculating the distance measure described above lies in efficiently finding the closest point to the transformation curves for each of the prototypes. This process is computationally very expensive.

However, for small transformations, the curve can be approximated by a linear curve, one which is tangent to the transformation curve at the point of interest. The linear curve (called the "hyperplane") may be characterized by a set of tangent vectors which can be derived directly from the specified transformations.

In many cases in the art of alphanumeric symbol recognition, the classification function is known to be locally invariant with respect to a set of locally differentiable transformations of the symbols. In other words, it may be known that the symbol class at a point P does not change for a point near P, which is obtained by applying a small transformation to P.

In this case, the set of all patterns obtained by applying transformations of the set (or combinations thereof) to P is a differentiable surface that contains P. The hyperplane tangent to the surface at P is called the tangent plane. This plane can be described by a set of basis vectors called the tangent vectors.

To compute the tangent vectors, first parameterize the set of transformations. All the transformations of pattern P can be obtained from P and some parameter $\alpha$ (which in some cases will be multidimensional) by computing a function $s(\alpha, P)$. The parameter $\alpha$ could be, for instance, the angle of a rotation, the displacement in a translation, or a pair representing both if $\alpha$ is multidimensional. Some reasonable restrictions are made on s. In particular $s(0,P)=P$ should hold, and s should be differentiable with respect to $\alpha$ and P. The first restriction merely states that 0 is the value of the parameter that corresponds to the identity. It is a convenient origin.

The differentiability requirement makes the computation of the tangent vectors more accurate. This latter restriction can require some processing of the data, in order to smooth the patterns so that small transformations produce small variations of the patterns. The dimension of the parameter $\alpha$ depends on the complexity of the transformation space considered. If, for example, only two transformations are considered, the $\alpha$'s are expressible as ordered pairs.

Figure 2:
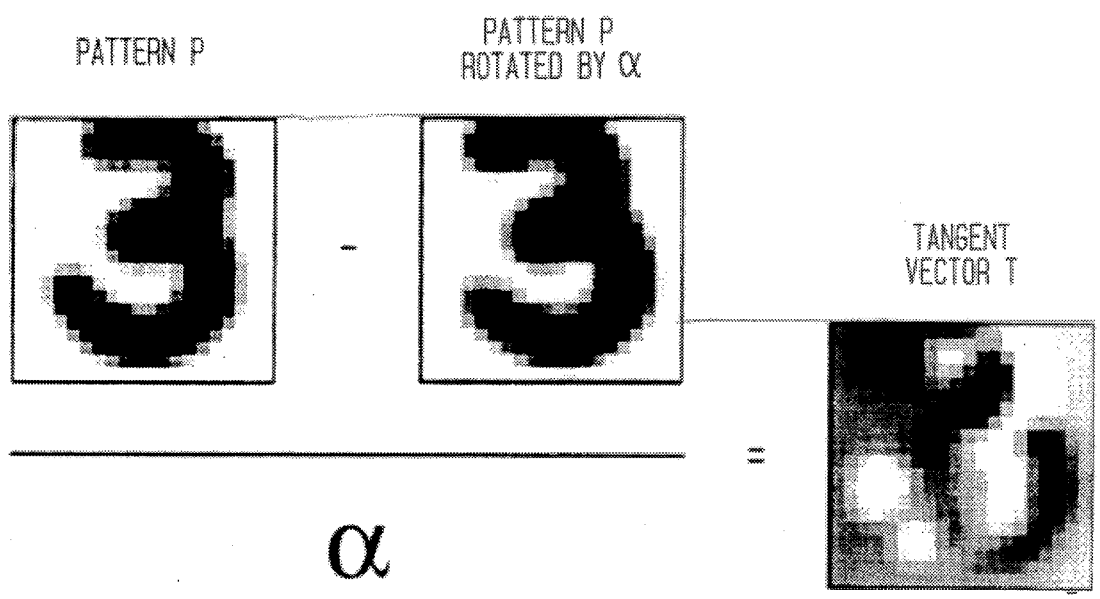
FIG. 2 is a chart illustrating the concept of tangent vector derivation applied to pixel data.

A simple illustration of the tangent vector for the case where the input is a 16×16 pixel image, is provided in FIG. 2 where a particular transformation of the number "3", a rotational transformation, is presented. First, an original pixel image denoted P, is used to construct a further image denoted $s(\alpha,P)$, differing from the original by a rotation through angle $\alpha$. The transformed image can be obtained by remapping the coordinates and estimating the new value of each remapped pixel by interpolating between original pixels.

As seen in FIG. 2, the tangent vector is defined as the (original image P minus the rotated images $s(\alpha,P)$) divided by $\alpha$. A resulting pixel image, denoted T, is thereby created and is one of the desired generators, or tangent vectors. The operations depicted (minus, plus, and scalar multiplication) are defined to be pixel-value by pixel-value subtraction and addition, and multiplication by a scalar.

Figure 3:
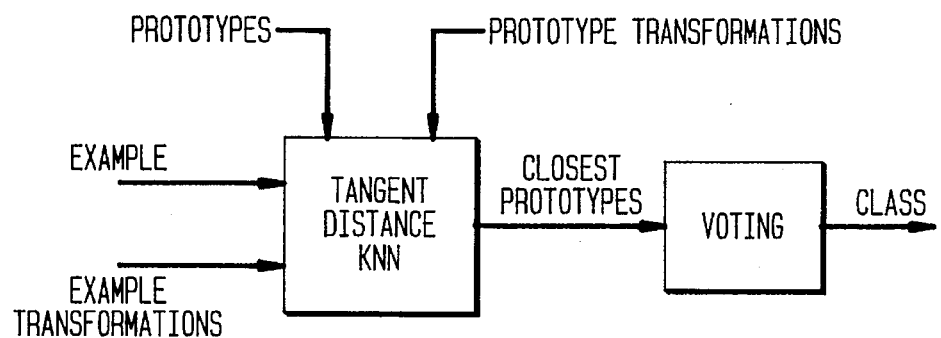
FIG. 3 is a high-level schematic block diagram showing information processing for obtaining closest prototype readouts.

In U.S. patent application Ser. No. 07/862,696, cited above, I describe a new distance measure which uses an augmented database containing information about a specific set of transformations. The illustrative classification procedure of FIG. 3 uses the additional information for both the examples and the prototypes to more accurately identify that prototype that is closest to the example. In simple implementations, the additional information consists only of the tangent vectors for each of the transformations. The result is a linear approximation of the transformations.

Assume, now, that the process of computing the tangent vectors has been performed for both the example to be recognized and the prototypes. The process of measuring the distance between two hyperplanes defined by points E and P (on the example and the prototype, respectively) and a set of tangent vectors $L_{Ei}$ and $L_{Pj}$ (corresponding to the transformation of the example and the prototype, respectively) is now discussed, first briefly, and then in greater detail.

Briefly, the computation of the tangent distance requires three steps, corresponding to solving a linear system c−Lx=0 (see Equation 5, below). The first step is to compute the difference vector between the prototype and the example, and then to compute all of the dot-products between this difference vector and all of the tangent vectors (from both the prototype and the example). The resulting coefficients constitute vector c. The second step is to compute all of the dot-products between all pairs of tangent vectors (from both the prototype and the example). These dot-products are the components of matrix L. The third step is to solve the linear system c−Lx=0. The actual distance can be easily computed from vector x.

It should be noted that the second step, which is where most of the computation takes place, can be greatly optimized. The dot-products between tangent vectors of the prototype can be computed in advance. Moreover, the dot-products between tangent vectors of the example need to be evaluated only once, since they are the same for each comparison with a different prototype. Furthermore, even the dot-products between tangent vectors of the prototypes and tangent vectors of the example can be optimized. In a hierarchy of distances involving one or a few new tangent vectors at a time, only the additional corresponding tangent vector dot-products will need to be evaluated. Because at each succeeding stage, fewer prototypes will be left, a still further saving of computational time will take place.

Figure 4:
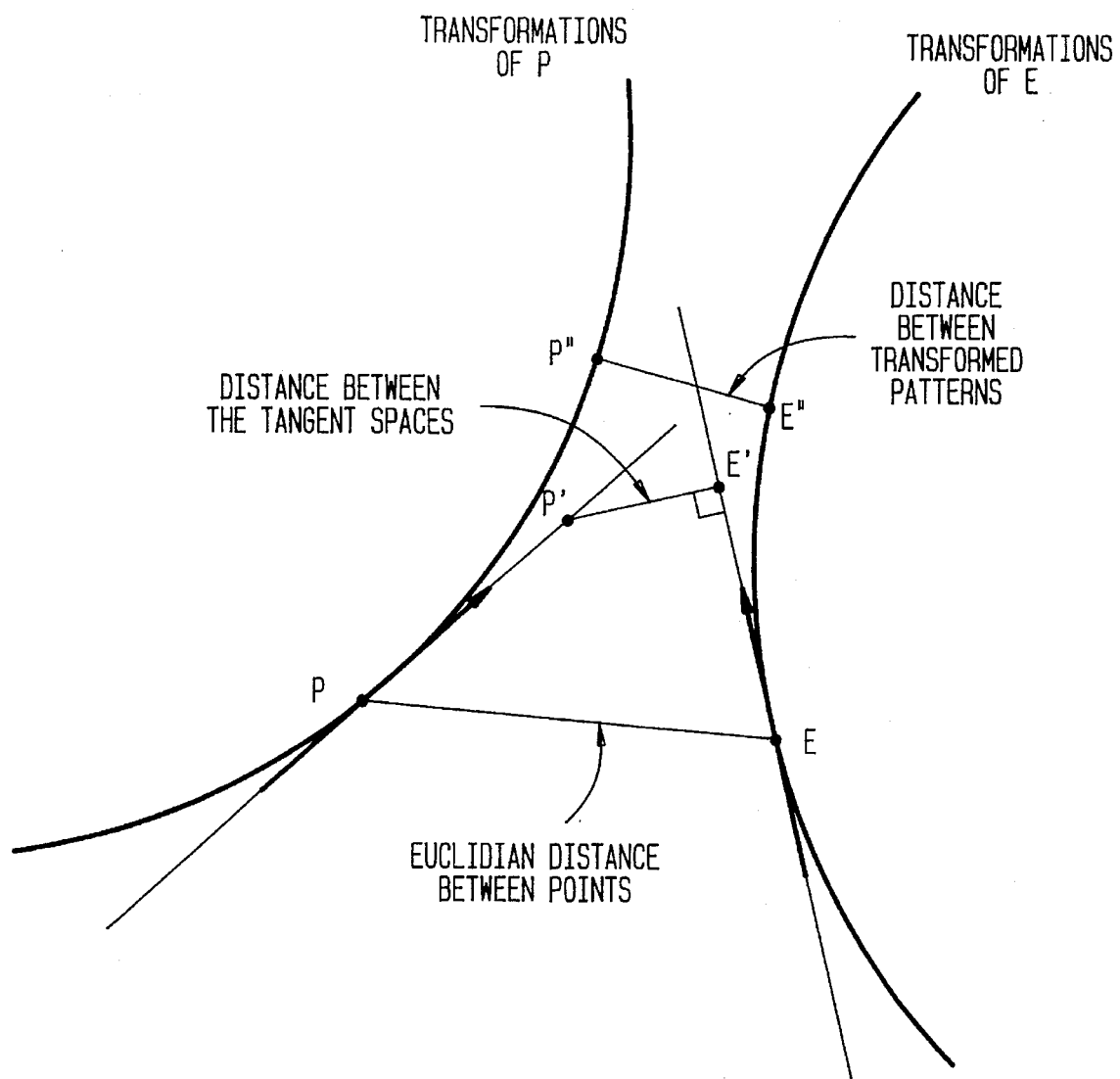
FIG. 4 is a graph illustrating the relationships and concepts of distance in accordance with the invention.

More specifically, now, the distance between two hyperplanes as schematically illustrated in FIG. 4 is uniquely defined to be the shortest distance between any two points lying on the respective hyperplanes. In the non-degenerate case, there exists a unique such pair noted E' and P'. Since E' belongs to the hyperplane going through example E with direction $L_{Ei}$, there exists a set of coefficients $\alpha_i$ such that Equation 1 is satisfied:

$$E - E' = \sum_{i=0}^{m-1} \alpha_i L_{Ei}. \quad (1)$$

Similarly, since P' belongs to the hyperplane going through prototype P with direction $L_{Pi}$, there exists a set of coefficients $\beta_j$ such that Equation 2 is satisfied:

$$P - P' = \sum_{j=0}^{m-1} \beta_j L_{Pi}. \quad (2)$$

It can be shown that in order to minimize the distance $$\|E' - P'\|^2 \quad (3)$$

between the two hyperplanes, $\alpha_i$ and $\beta_j$ must be given by the solution of the system:

$$\begin{bmatrix} (P_E - P_P)^T L_{E1} \\ \cdot \\ \cdot \\ (P_E - P_P)^T L_{En} \\ (P_E - P_P)^T L_{P1} \\ \cdot \\ \cdot \\ (P_E - P_P)^T L_{Pn} \end{bmatrix} - \begin{bmatrix} L_{E1}^T L_{E1} \ldots L_{E1}^T L_{En} & L_{P1}^T L_{E1} \ldots L_{Pm}^T L_{E1} \\ \cdot \quad \cdot & \cdot \quad \cdot \\ \cdot \quad \cdot & \cdot \quad \cdot \\ L_{En}^T L_{E1} \ldots L_{En}^T L_{En} & L_{P1}^T L_{En} \ldots L_{Pm}^T L_{En} \\ L_{P1}^T L_{E1} \ldots L_{P1}^T L_{En} & L_{P1}^T L_{P1} \ldots L_{Pm}^T L_{P1} \\ \cdot \quad \cdot & \cdot \quad \cdot \\ \cdot \quad \cdot & \cdot \quad \cdot \\ L_{Pm}^T L_{E1} \ldots L_{Pm}^T L_{En} & L_{P1}^T L_{Pm} \ldots L_{Pm}^T L_{Pm} \end{bmatrix} \begin{bmatrix} \alpha_1 \\ \cdot \\ \cdot \\ \alpha_n \\ \beta_1 \\ \cdot \\ \cdot \\ \beta_m \end{bmatrix} = 0. \quad (4)$$

The above system can be described in a more compact way:

$$\begin{bmatrix} C_E \\ C_P \end{bmatrix} - \begin{bmatrix} L_{EE} & L_{EP} \\ L_{PE} & L_{PP} \end{bmatrix} \times \begin{bmatrix} \alpha \\ \beta \end{bmatrix} = 0 \quad (5)$$

which has as a solution:

$$\alpha = (L_{EP} L_{PP}^{-1} L_{PE} - L_{EE})^{-1} (L_{EP} L_{PP}^{-1} C_P - C_E); \quad (6)$$

$$\beta = (L_{PP} - L_{PE} L_{EE}^{-1} L_{EP})^{-1} (L_{PE} L_{EE}^{-1} C_E - C_P). \quad (7)$$

It should be noted that $L_{EE}$ and $L_{PP}$ are square matrices, and thus their inverses $L_{EE}^{-1}$ and $L_{PP}^{-1}$, respectively, exist provided the tangent vectors are linearly independent.

It should be further noted that $L_{EE}^{-1}$ does not need to be recomputed from prototype to prototype; and that $L_{PP}^{-1}$ can be stored for each prototype. Therefore, only two small systems, one m-by-m and one n-by-n, need to be solved at recognition time.

Additional constraints can be imposed on α and β to prevent the effect of too large a deformation. For instance, if both the prototype and the example are scaled down to a few pixels, the distance between them may be arbitrarily small and therefore meaningless. A constraint on the maximum values of the scaling parameter would prevent this from happening.

If α or β is large, E' or P' may lie far from the transformation curve (see FIG. 4), and the linear approximation may be invalid. This may lead to an incorrect evaluation of the distance. One way to avoid that problem is to limit the values of $\alpha_i$ and $\beta_j$ to be less in absolute value than some predefined constant. These constants can be chosen to prevent excessive pixel saturation of the transformed image. The resulting E' and P' will therefore not be too far from E and P.

It will be understood that computation time can be reduced by various methods for approximating the distance between the two hyperplanes without fully solving Equation 4.

Figure 5:
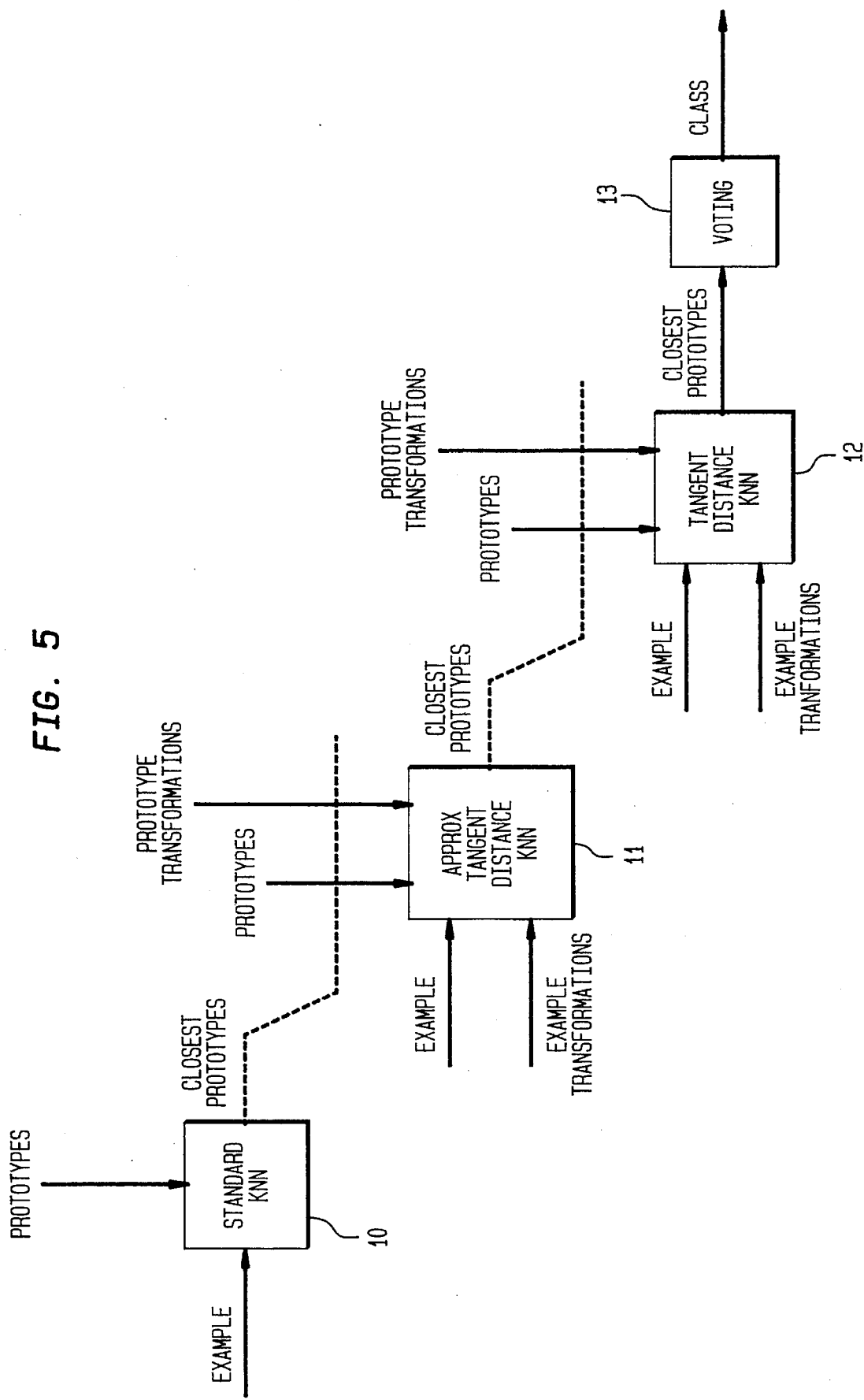
FIG. 5 is a flowchart illustrating a process for reducing computational times by establishing a hierarchy of distances.

In U.S. patent application Ser. No. 07/862,696, cited above, I described a process for reducing the computational time for computing the distance by establishing a hierarchy of distances according to their respective accuracies and computational times, as illustrated in FIG. 5.

Since the Euclidean distance is computationally fast in the sense that it only involves performing at most 3N multiply-add operations (of which 2N operation can be pre-computed), where N is the number of pixels, it is possible to go through a large database of prototypes, son the result by distances and retain only a small percentage of that database corresponding to the prototypes that are closest to the example. The selected patterns can be compared with the example using a more computationally intensive distance. In turn, the remaining prototypes can be sorted with this new distance and a small fraction of those can be selected. The process can be repeated several times, progressing with each step to a distance that is more computationally intensive, but involves a smaller and more refined set of prototypes.

By "computationally intensive" is meant the relative number of floating point operations required to compute a given distance function. How computationally intensive the function is will depend upon the number of pixels in the input and prototype images of interest, and will also depend upon the complexity of the distance function. The complexity of a given tangent distance increases with the number of tangent vectors used in its computation. The Euclidean distance, which uses no tangent vectors, is assigned a complexity of 0.

I have found that a hierarchical approach of this kind can achieve still greater efficiency and accuracy when tangent distances of variable complexity are used together with variable degrees of image resolution. Accordingly, I describe such a new approach below, with reference to FIG. 6.

By way of example, I have calculated tangent distances based on 1 to 7 tangent vectors for the example (i.e., input pattern) side of the calculation, and 1 to 7 tangent vectors for the prototype side. Thus, my exemplary calculations have complexity values up to 14.

The total number of independent tangent vectors corresponding to a given transformation is equal to the number of degrees of freedom of that transformation. The transformations used in my exemplary calculations are x- and y-translations (contributing one tangent vector each), uniform scaling and rotation (contributing one tangent vector each), the hyperbolic deformation that scales the x- and y-axes in opposite senses (one tangent vector), the hyperbolic deformation that scales the two principal diagonals in opposite senses (one tangent vector), and a linear approximation of a thickness-modifying transformation (also contributing one tangent vector). This last transformation operates by adding to the gray value, at each image point, an increment proportional to the square of the first derivative of the grayness level, evaluated over a suitable locality.

The degree of image resolution is expressed by the total pixel count. My exemplary distance calculations have been performed on images ranging from a maximum pixel count of 16×16, down to a count of 2×2. By way of illustration, the different distances calculated ranged in computational time from 4 multiply-adds to evaluate a Euclidean distance on a 2×2 averaged image, to 20,000 multiply-adds to evaluate a tangent distance using 7 tangent vectors and 16×16 images.

Figure 6:
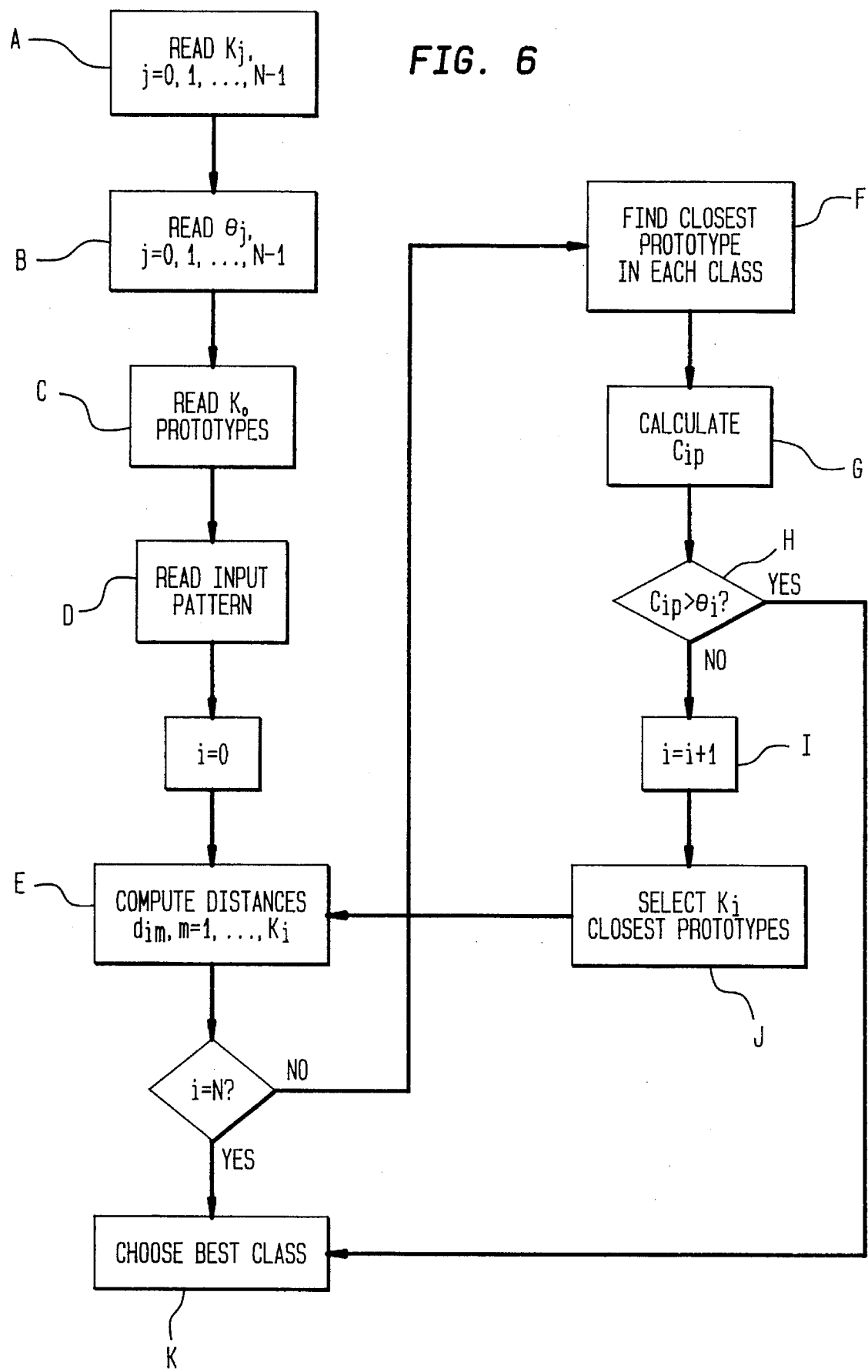
FIG. 6 is a flowchart illustrating the classification of an input pattern according to the invention in one embodiment.

Assume that we are given one unknown pattern to classify (in Step D of FIG. 6), and that all distances will be computed (in Step E) between this pattern and known (labeled) prototypes. (FIG. 6 shows the prototypes being read in at Step C. Of course, it will often be the case that a set of prototypes is read in once, and then used for classifying numerous input patterns.) Assume further that we have several distance metrics $d_i$ which are increasing in complexity and accuracy. The first distance $d_0$ is computed on all $K_0$ prototypes of the database. The closest $K_1$ patterns are then selected and passed to the next stage. This process is repeated for each of the distances; i.e., at each of the stage i, the distance $d_i$ is computed on each of the $K_i$ patterns selected by the previous stage. As the complexity of the distance is increased, the number of patterns on which this distance must be computed is concomitantly decreased. At the last stage, the most complex and accurate distance is computed on all remaining patterns to determine the classification.

It should be noted in this regard that a full sort, of order Nlog N, is not required in order to find the $K_i$ closest patterns at each stage i of this procedure. Instead, an algorithm of order N is available to perform this task. According to this algorithm, the average distance $\bar{d}_i$ is computed in each pass, and the individual distances are grouped according to whether they lie above or below $\bar{d}_i$. If the group lying below $\bar{d}_i$ contains more than $K_i$ entries, it becomes the object for a second pass. Otherwise, the group lying above $\bar{d}_i$ becomes the object for a second pass. After at most log N passes (involving successively smaller groups of prototype patterns), the number of distances $d_i$ laying below $\bar{d}_i$ will be exactly $K_i$.

For each stage, it is necessary to establish a corresponding value of the parameter $K_i$. (These values are shown in FIG. 6 as being read in at Step A.) This value is ideally the smallest value for which the filtering does not decrease the overall performance. (Increasing $K_i$ will always improve the performance, in the sense that it makes it possible to find patterns that are closer for the next distance By way of example, I have calculated tangent distances based on 1 to 7 measure $d_{i+1}$.) One method for determining $K_i$ is based on a validation set that consists of input images of known classes that are statistically representative of the population of unknown input images. The performance of the filtering method in classifying the validation set can be plotted on a graph as a function of $K_i$. The optimal $K_i$ can then be determined, e.g., graphically. Automatic methods for computing each $K_i$ can also be implemented.

Figure 7:
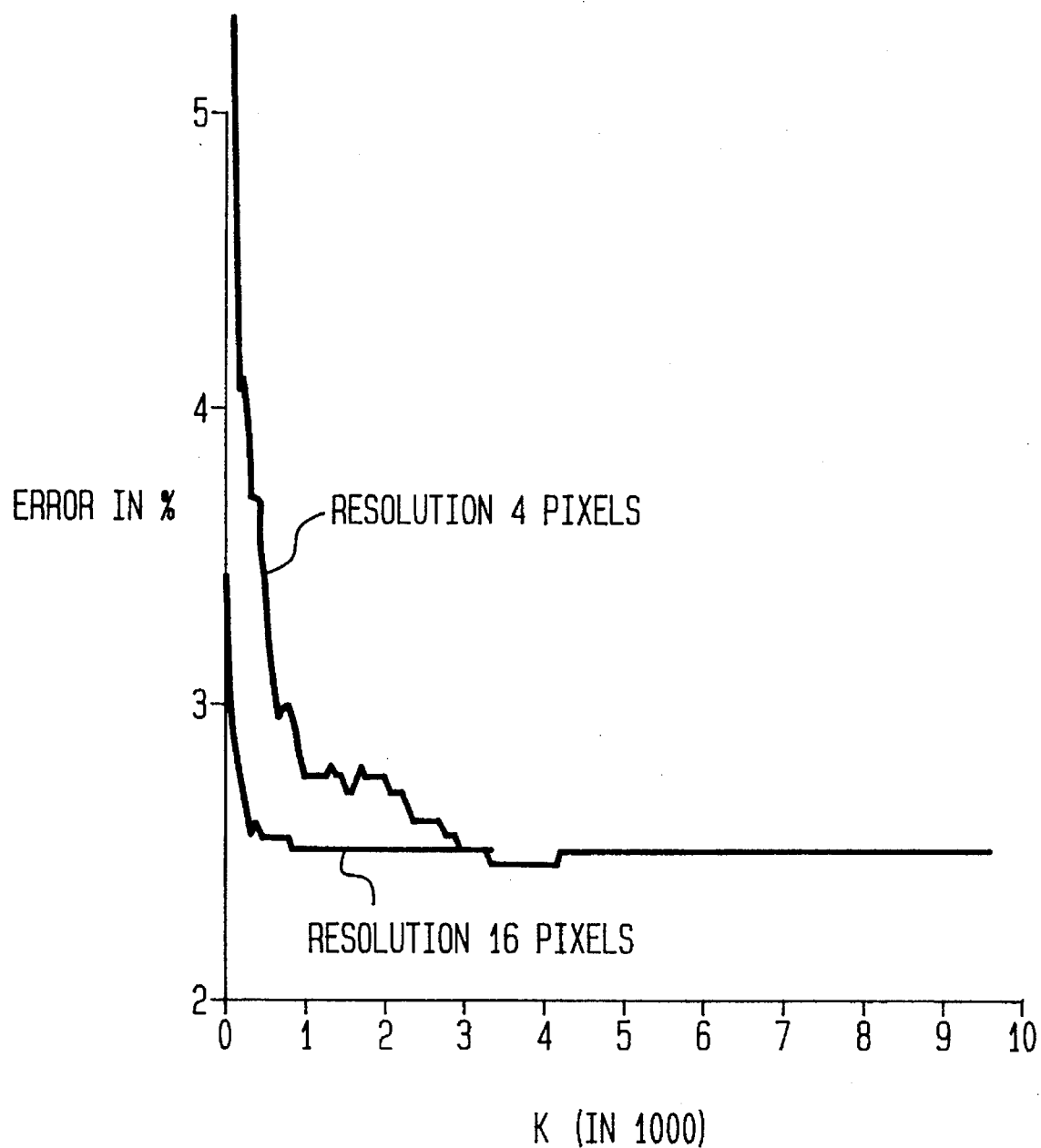
FIG. 7 is a graph illustrating the raw error performance of the inventive method as a function of $K_1$ and $K_2$, wherein $K_1$ is defined as the number of prototype patterns retained at the $i^{th}$ stage of the algorithm of FIG. 6.

This method is particularly useful when the performance is not degraded by choosing small $K_i$. If, on the other hand, it is not feasible to choose small $K_i$, it is desirable, instead, to minimize the computational requirements by selecting distance metrics that are relatively inexpensive to compute. FIG. 7 shows the performance of the hierarchical filtering method as a function of $K_1$ and $K_2$ in an experimental test to be described below.

Figure 8:
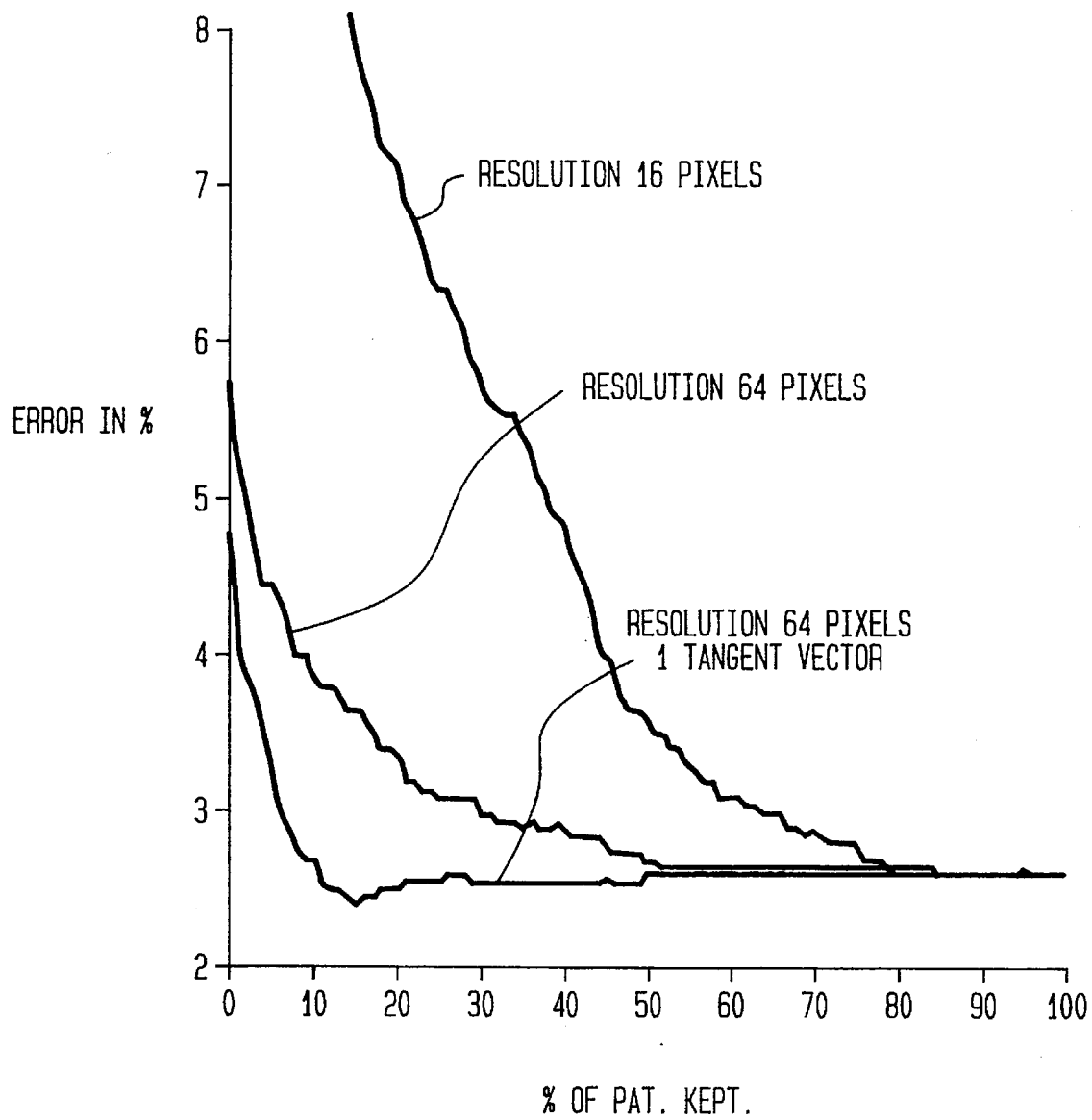
FIG. 8 is a graph illustrating the raw error performance of the inventive method as a function of image resolution and the setting of the confidence threshold $\theta_i$. In the figure, this threshold is defined by the percentage of input patterns that fail the confidence test and are consequently passed to the next stage of the algorithm of FIG. 6. Thus, a high percentage of patterns kept implies a high setting for the confidence threshold.

A confidence score computed at each stage of the distance evaluation (at Step G of FIG. 6) can be used, in the case of some well-distinguished patterns, to avoid completely computing the most expensive distances. In the extreme case, if the Euclidean distance between two patterns is 0, there is no need to compute the tangent distance at all. A simple (and crude) way to compute a confidence score at a given stage i, is find the closest prototype (for distance $d_i$) in each of the possible classes (Step F). The difference of distances between the closest class and the next closest gives an approximation of a confidence of this classification. A simple algorithm is then to compare at stage i the confidence score $c_{ip}$ of the current unknown pattern p to a threshold $\theta_i$ (Step H), and to stop the classification process for this pattern as soon as $c_{ip} > \theta_i$. The classification can then be performed using any suitable decision procedure. The computation time will therefore be different depending on the pattern to be classified. Easy patterns will be recognized very quickly while difficult patterns will need to be compared to some of the prototypes using the most complex distance. Note that if all $\theta_i$ are high, the performance is maximized (but so is the cost). I therefore wish to find the smallest value of $\theta_i$ which does not degrade the performance (increasing $\theta_i$ always improves the performance). As in the previous section, the optimal $\theta_i$ can be determined, e.g., graphically. Curves representing the performance of the hierarchical filtering method as a function of $\theta_i$ are shown in FIG. 8 for an experimental test to be described below.

EXAMPLE

The prototype set and the test set consisted respectively of 9709 and 2007 labeled images (16 by 16 pixels) of handwritten digits. The prototypes were also averaged to lower resolutions (2-by-2, 4-by-4 and 8-by-8) and copied to separate databases. The 1 by 1 resolution was not useful for anything. Therefore the fastest distance was the Euclidean distance on 2-by-2 images, while the slowest distance was the full tangent distance with 7 tangent vectors for both the prototype and the unknown pattern. Table 1 summarizes the results.

The first column of Table 1 represents the distance index. The second column shows the corresponding number of tangent vectors (0 for Euclidean distance). The third column shows the image resolution (as a total pixel count). The fourth column shows the number $K_i$ of prototypes for which the distance $d_i$ was computed. The fifth column shonws the number of additional dot products which were computed to evaluate $d_i$. The sixth column represents the threshold setting of a confidence-score test by the proportion of input patterns that would be passed to the next stage. The last column shows the total average number of multiply-adds that were performed at each stage.

It should be noted in this regard that each time the number of tangent vectors was increased, the resulting distance function also used all of the previous tangent vectors. Substantial computational economy was achieved by saving, for use in succeeding distance calculations, coefficients calculated (on smaller tangent-vector sets) for preceding distance calculations.

I found that simple distance metrics are very useful to eliminate large proportions of prototypes at no cost in performance. Indeed, the Euclidean distance computed on 2-by-2 images was able to remove two-thirds of the prototypes. FIG. 7 shows the performance as a function of $K_1$ and $K_2$ (2.5% raw error was considered optimal performance). It should be noted that for $K_i$ above a certain value, the performance is optimal and constant. The most complex distances (6 and 7 tangent vectors on each side) needed to be computed for only 5% of the prototypes.

I also found that the use of a confidence score can greatly reduce the number of distance evaluations in later stages. For instance, the dominant phases of the computation would be with 2, 4 and 6 tangent vectors at resolution 256 if these were not reduced to 60%, 40%, and 20%, respectively using the confidence scores. FIG. 8 shows the raw error performance as a function of the percentage of rejection (confidence lower than $\theta_i$) at stage i. It should be noted that above a certain threshold, the performance is optimal and constant. It was necessary to compute the most complex distances (5, 6 and 7 tangent vectors on each side) for fewer than 10% of the unknown patterns.

I compared my hierarchical filtering method with a computation of the full tangent distance on all patterns. I found that the hierarchical filtering method was faster by about three orders of magnitude, with no decrease in performance.

| i | No. of T.V. | Reso | No. of proto ($K_i$) | No. of prod | % of kept | No. of mul/add |
|---|---|---|---|---|---|---|
| 0 | 0 | 4 | 9709 | 1 | 100% | 40,000 |
| 1 | 0 | 16 | 3500 | 1 | 100% | 56,000 |
| 2 | 0 | 64 | 500 | 1 | 100% | 32,000 |
| 3 | 1 | 64 | 125 | 2 | 90% | 14,000 |
| 4 | 2 | 256 | 50 | 5 | 60% | 40,000 |
| 5 | 4 | 256 | 45 | 7 | 40% | 32,000 |
| 6 | 6 | 256 | 25 | 9 | 20% | 11,000 |
| 7 | 8 | 256 | 15 | 11 | 10% | 4,000 |
| 8 | 10 | 256 | 10 | 13 | 10% | 3,000 |
| 9 | 12 | 256 | 5 | 15 | 5% | 1,000 |
| 10 | 14 | 256 | 5 | 17 | 5% | 1,000 |

I claim:

1. A method for sorting articles bearing graphical patterns to be referred to as input patterns, the method comprising the steps of: converting each input pattern to a pixel array, storing the pixel array in a digital pattern-recognition machine, classifying each input pattern, and performing a prescribed physical manipulation of each article in response to the result of classifying the pattern borne by that article;

wherein the machine comprises a storage device and a library of prototype patterns stored within the storage device, each prototype pattern belongs to one of a multiplicity of known classes, and each prototype pattern is labeled with its respective class, and the classifying step comprises, in said machine:

a) for each input pattern, retrieving each of the prototype patterns from the storage device and evaluating a distance function $d_1$ between the input pattern and each of the prototype patterns, wherein $d_1$ is the first of a plurality of distance functions $d_i$, i=1, ..., M, M a positive integer at least 2;

b) responsive to (a), keeping the $K_1$ closest prototype patterns and eliminating from consideration the rest of the prototype patterns, wherein $K_1$ is a positive integer less than the total number of prototype patterns in the library;

c) evaluating at least one further distance function $d_j$ between the input pattern and at least some of the $K_1$ closest prototype patterns, wherein j is a positive integer at least 2 and at most M;

d) responsive to the evaluation of each further distance function $d_i$, i=2, ... M, keeping the $K_i$ closest prototype patterns and eliminating from consideration the rest of the prototype patterns, wherein $K_i$ is a positive integer less than $K_{i-1}$; and e) choosing the best class, according to an appropriate decision procedure, from the classes represented in a population of prototype patterns that is limited in response to the evaluation of the last distance function $d_M$, wherein:

f) each evaluation of step (c) is carded out between the input pattern and the $K_{j-1}$ closest prototype patterns that were kept in response to the evaluation of the last preceding distance function $d_{j-1}$;

g) at least one of the further distance functions $d_i$, i at least 2, such distance to be referred to as a tangent distance of complexity $L_i$, is evaluated with reference to a set of image transformations that are selected to leave the respective classes of the prototype patterns invariant, and such evaluation comprises the further steps of:

generating $L_i$ tangent vectors from a subset of said image transformations, wherein $L_i$ is at least 1, and the $L_i$ tangent vectors define an input hyperplane containing the input pattern; and evaluating a Euclidean distance with respect to a transformed pattern lying on the input hyperplane.

2. A method for sorting articles bearing graphical patterns to be referred to as input patterns, the method comprising the steps of: converting each input pattern to a pixel array, storing the pixel array in a digital pattern-recognition machine, classifying each input pattern, and performing a prescribed physical manipulation of each article in response to the result of classifying the pattern borne by that article;

wherein the machine comprises a storage device and a library of prototype patterns stored within the storage device, each prototype pattern belongs to one of a multiplicity of known classes, and each prototype pattern is labeled with its respective class; and the classifying step comprises, in said machine:

a) for each input pattern, retrieving each of the prototype patterns from the storage device and evaluating a distance function $d_1$ between the input pattern and each of the prototype patterns, wherein $d_1$ is the first of a plurality of distance functions $d_i$, i=1, ..., M, M a positive integer at least 2;

b) responsive to (a), keeping the $K_1$ closest prototype patterns and eliminating from consideration the rest of the prototype patterns, wherein $K_1$ is a positive integer less than the total number of prototype patterns in the library;

c) evaluating at least one further distance function $d_j$ between the input pattern and at least some of the $K_1$ closest prototype patterns, wherein j is a positive integer at least 2 and at most M;

d) responsive to the evaluation of each further distance function $d_i$, i=2, ... M, keeping the $K_i$ closest prototype patterns and eliminating from consideration the rest of the prototype patterns, wherein $K_i$ is a positive integer less than $K_{i-1}$; and e) choosing the best class, according to an appropriate decision procedure, from the classes represented in a population of prototype patterns that is limited in response to the evaluation of the last distance function $d_M$, wherein:

f) each evaluation of step (c) is carded out between the input pattern and the $K_{j-1}$ closest prototype patterns that were kept in response to the evaluation of the last preceding distance function $d_{j-1}$;

g) at least one of the further distance functions $d_i$, i at least 2, such distance to be referred to as a tangent distance of complexity $L_i$, is evaluated with reference to a set of image transformations that are selected to leave the respective classes of the prototype patterns invariant, and such evaluation comprises the further steps of:

generating $L_i$ tangent vectors from a subset of said image transformations, wherein $L_i$ is at least 1, and the $L_i$ tangent vectors define a prototype hyperplane containing a prototype pattern; and evaluating a Euclidean distance with respect to a transformed pattern lying on the prototype hyperplane.

3. The method of claim 1 or claim 2, wherein each distance function $d_i$, i=1, ..., M, is a distance function in a vector space of a respective dimensionality.

4. The method of claim 3, wherein at least two distance functions are evaluated in respective vector spaces having different dimensionalities, and the distance function having the smaller dimensionality is evaluated before the distance function having the larger dimensionality.

5. The method of claim 3, wherein at least two of the distance functions are tangent distances having different respective complexities, and the distance function having the smaller complexity is evaluated before the distance function having the greater complexity.

6. The method of claim 3, further comprising, for each value of i, after evaluating the distances $d_i$, the further steps of:

evaluating a confidence score that measures the effectiveness of $d_i$ for distinguishing between at least two prototype classes; and if the confidence score exceeds a predetermined threshold, going to the step of choosing the best class without performing the step of evaluating a succeeding distance $d_{i+1}$.

7. The method of claim 6, wherein each confidence score is the difference between d i for the closest prototype pattern $P_0$, and $d_i$ for the closest prototype pattern not in the same class as $P_0$.

* * * * *